US006958878B2

(12) United States Patent
Jaquette et al.

(10) Patent No.: US 6,958,878 B2
(45) Date of Patent: Oct. 25, 2005

(54) FORCED BACKHITCH FOR SPEED MATCHING IN A MULTI-SPEED TAPE DRIVE

(75) Inventors: Glen Alan Jaquette, Tucson, AZ (US); Arturo Avila Mojica, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 10/694,374

(22) Filed: Oct. 27, 2003

(65) Prior Publication Data

US 2005/0088771 A1 Apr. 28, 2005

(51) Int. Cl.[7] ............................................. G11B 15/46
(52) U.S. Cl. ........................................................ 360/73.04
(58) Field of Search ........................ 360/73.04, 71, 360/72.1; 710/53

(56) References Cited

U.S. PATENT DOCUMENTS

| 5,406,425 | A | * | 4/1995 | Johnston et al. ............... 360/48 |
| 5,892,633 | A | | 4/1999 | Ayres et al. ............. 360/73.08 |
| 5,944,802 | A | | 8/1999 | Bello et al. .................... 710/52 |
| 6,002,836 | A | | 12/1999 | Inoue et al. ................... 386/95 |
| 6,038,620 | A | | 3/2000 | Yanes et al. ................... 710/52 |
| 6,307,701 | B1 | * | 10/2001 | Beavers et al. .......... 360/73.08 |
| 6,308,228 | B1 | | 10/2001 | Yocum et al. ................ 710/52 |
| 6,366,969 | B1 | | 4/2002 | Hanson ....................... 710/52 |
| 6,459,540 | B1 | | 10/2002 | Beavers et al. .......... 360/73.08 |
| 6,791,781 | B2 | * | 9/2004 | Bui et al. .................. 360/72.2 |
| 2002/0030918 | A1 | | 3/2002 | Beavers et al. .......... 360/73.08 |
| 2002/0120797 | A1 | | 8/2002 | Fabre .......................... 710/60 |

* cited by examiner

*Primary Examiner*—David Hudspeth
*Assistant Examiner*—K. Wong
(74) *Attorney, Agent, or Firm*—John H. Holcombe

(57) ABSTRACT

In a magnetic tape drive having a plurality of stepped operational speeds, data storage logic estimates, from the effective data fill rate for a data buffer and the drive data write rate, the time cost to continue to operate the magnetic tape drive at the current stepped operational speed from a target to the next end of wrap; estimates, the time cost to force a backhitch of the magnetic tape data storage media and change the stepped operational speed to a higher stepped operational speed and operate the magnetic tape drive at the higher stepped operational speed to the next end of wrap; and determines the lesser time cost.

30 Claims, 4 Drawing Sheets

FORCED BACKHITCH FOR SPEED MATCHING IN A MULTI-SPEED TAPE DRIVE

FIELD OF THE INVENTION

This invention relates to storing data on magnetic tape data storage media by a magnetic tape drive, and, more particularly, to matching the effective data fill rate for at least one data buffer to the drive data rate in a multi-speed magnetic tape drive.

BACKGROUND OF THE INVENTION

Magnetic tape systems provide convenient and low cost means for storing data. Quantities of data may be stored on a single magnetic tape data storage media, allowing higher cost storage media to be employed for other purposes. The data is typically supplied from a host at an input to the tape drive and to one or more data buffers and is thus buffered while being written to the magnetic tape data storage media by the magnetic tape drive. The speed at which the data is supplied to the data buffer (herein "buffer" may comprise one or more buffers) may not match the speed or data rate at which the magnetic tape drive writes data to the magnetic tape data storage media. Similarly, data is typically read from the magnetic tape data storage media and then supplied to the data buffer and supplied from the data buffer to the host at an output from the magnetic tape drive. The speed at which data is read from the magnetic tape data storage media and supplied to the buffer may not match the speed or data rate at which the data is transferred from the buffer to the host at the output of the tape drive. If, in writing, the data is supplied to the data buffer at a fill rate which is less than the write data rate of the magnetic tape drive, the data buffer empties and the magnetic tape drive typically stops and waits for the data buffer to fill to a point that writing may resume. To save space on the tape, the magnetic tape drive backhitches and repositions the magnetic tape data storage media to a point sufficiently far upstream of the point at which writing stopped, so that the tape can be accelerated to the writing speed and writing can resume at the point at which the writing stopped. In addition, in small buffer environments, the host effective data rate may be marginal such that the buffer can be filled during the backhitch time. If this is the case, the host or system which is supplying the data is held off from supplying data once the buffer fills until the backhitch completes. If the host's data is supplied to the tape drive's buffer at a fill rate which is greater than the data rate of the magnetic tape drive, the data buffer can become full, and the host or system which is supplying the data is held off from supplying new data. Performance is thus lost as no data is transferred until sufficient room is freed in the buffer to resume filling it from the host.

When reading data from the magnetic tape data storage media, if the drive data rate is higher than the rate at which data is transferred from the data buffer to the host system, the data buffer may fill and the magnetic tape drive typically stops and waits for the data buffer to empty to a point that there is sufficient room in the buffer to resume reading data from the magnetic tape data storage media. In order to begin reading at the point at which reading was stopped, the magnetic tape drive backhitches and repositions the magnetic tape data storage media to a point sufficiently far upstream of the point at which reading stopped, so that the tape can be accelerated to the reading speed and reading can resume at the point at which the reading stopped. If the read data is supplied to the data buffer from the magnetic tape data storage media at a rate which is less than the effective data rate of the host, the data buffer empties, and the host or system to which the data is being transferred is forced to stop accepting new data at that rate. Performance is thus lost as no data is transferred for some period of time that the host could otherwise have been receiving data.

Excessive backhitching may reduce the performance of the magnetic tape drive by reducing the transfer of data, above, and wears both the magnetic tape drive and the magnetic tape data storage media.

One way of reducing the issue is to have a very large data buffer. Such data buffers are expensive however, and thereby increase the cost of the magnetic tape system, but may be able to reduce the number of stops the tape drive is required to perform and hide the effects of stopping and backhitching so that it does not affect performance.

Performance is lost if the data fill and/or empty rate is greater than the drive data rate. If, in writing, the data is supplied to the data buffer at a fill rate which is greater than the write data rate of the magnetic tape drive, the data buffer can become full, and the host or system which is supplying the data is held off from supplying new data, reducing the drive performance. When reading data from the magnetic tape data storage media, if the rate at which data is transferred from the data buffer to the host system is greater than the drive data rate, the data buffer may empty and the host or system to which the data is being transferred is forced to stop accepting new data at that rate, reducing the drive performance.

Multi-speed magnetic tape drives offer the promise of better matching the rate at which data is supplied to the data buffer. For example, a magnetic tape data storage media may comprise a plurality of "wraps", in which data is recorded in a serpentine pattern in which data is recorded back and forth along the length of the tape in a number of sets of tracks, each set of tracks called a wrap. The tape is stopped at an End of Wrap (EOW) and reverses direction and the magnetic tape drive resumes writing in the opposite direction on another wrap. Speed changes may be made when the tape drive resumes writing, and, if the data buffer is nearly empty at the end of wrap, new data may be added to the data buffer during the period during which the tape is stopped at the end of wrap and before writing is resumed.

Alternatively, a magnetic tape drive may have continuous speed changing ability such that the speed may be changed on the fly. A continuous speed changing ability, however, can also be expensive, thereby increasing the cost of the magnetic tape drive. It can also be unreliable and difficult to implement in that a stable write clock must be established which is tied to the speed of the media almost exactly.

SUMMARY OF THE INVENTION

The present invention comprises, in various embodiments, data storage logic, a recording system, a magnetic tape drive, a computer program product, and a method, for recording data with a magnetic tape drive having a drive system with a plurality of stepped operational speeds for reading and/or writing data to magnetic tape data storage media, having at least one input and/or output for attachment to a host system, and having at least one data buffer (as discussed above, "buffer" may comprise one or more buffers).

In an embodiment of the present invention, the magnetic tape drive is capable of conducting a backhitch of the magnetic tape data storage media. The data is stored on the magnetic tape data storage media in a plurality of wraps, which comprise a plurality of parallel longitudinally recorded tracks.

As one example, the data storage logic:

estimates the effective data fill and/or empty rate for the data buffer with respect to the input and/or output;

estimates the drive data rate for transferring data with respect to the data buffer and the magnetic tape data storage media at the current stepped operational speed of the magnetic tape drive;

estimates, from the effective data fill and/or empty rate for the data buffer and the drive data rate, the time cost to continue to operate the magnetic tape drive at the current stepped operational speed from a target to substantially the next end of wrap;

estimates, from the effective data fill and/or empty rate for the data buffer and a data rate for transferring data with respect to the magnetic tape data storage media of at least one higher stepped operational speed, if any, of the magnetic tape drive, together with a forced a backhitch of the magnetic tape drive, the time cost to force a backhitch and change the stepped operational speed to the higher stepped operational speed and to operate the magnetic tape drive at the higher stepped operational speed from the target to substantially the next end of wrap; and determines the lesser of the time costs.

In a further embodiment, a threshold, such as a predetermined count, is monitored for the number of instances of a lesser time cost to force the backhitch and change the stepped operational speed at the target to the higher stepped operational speed upon the backhitch; and if the threshold is met and/or exceeded, the determined lesser time cost is selected which comprises forcing the backhitch of the magnetic tape data storage media to a target and changing the stepped operational speed by the target to the higher stepped operational speed upon the backhitch; and, if the threshold is unmet and/or unexceeded, the current stepped operational speed is selected without regard to which estimated time cost comprises the lesser of the estimated time costs.

In one embodiment, the threshold comprises a predetermined count; and the time cost estimates are conducted on a periodic basis, and the count is incremented at each successive instance that the periodic time cost estimates determines the lesser one of the time costs is the time cost to force the backhitch and change the stepped operational speed; the count is reset upon forcing the backhitch.

In another embodiment, if the lesser time cost comprises the higher stepped operational. speed, and the higher stepped operational speed is selected, the data capacity threshold of the buffer is controlled to establish the timing of the backhitch and speed change.

In still another embodiment, additionally, the distance to an end of wrap is determined, and, if the distance to an end of wrap is less than a predetermined distance, as an example, the data storage logic prevents a backhitch.

In a still further embodiment, two stepped operational speeds are determined bounding the estimated data fill and/or empty rate for the buffer, and the lesser time cost determination is made with respect to the two operational speeds and the current operational speed.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
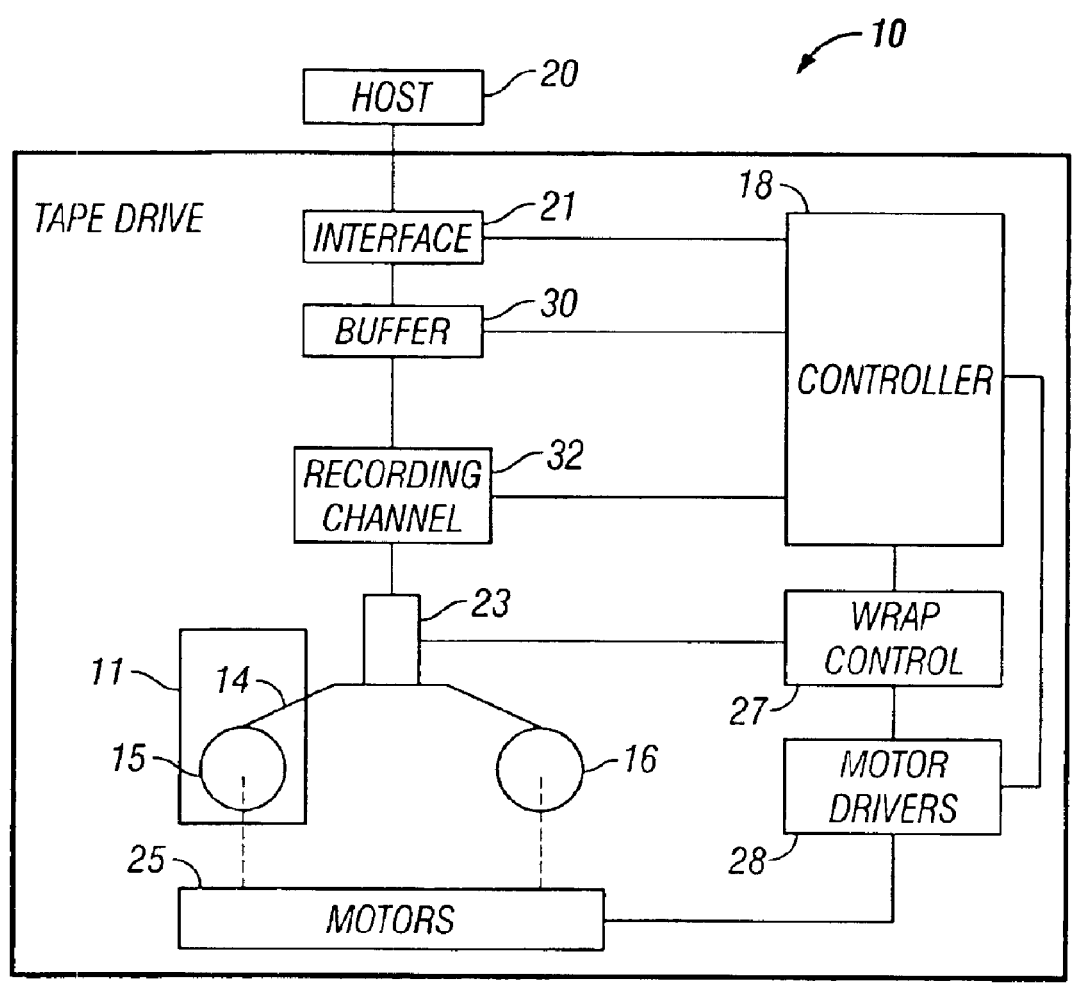
FIG. 1 is a block diagram of an embodiment of a magnetic tape drive which implements the present invention, with magnetic tape data storage media, and a host system.

Referring to FIG. 1, a tape drive 10 is illustrated which may implement aspects of the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM 3580 Ultrium magnetic tape drive based on LTO technology. An example of a dual reel cartridge is the IBM 3570 magnetic tape cartridge and associated drive.

As is understood by those of skill in the art, a magnetic tape cartridge 11 comprises a magnetic tape data storage media 14 wound on one or two reels 15, 16. Also as is understood by those of skill in the art, a tape drive 10 comprises one or more controllers 18 of a recording system for operating the tape drive in accordance with commands received from a host system 20 received at an interface 21. The interface 21 also comprises an input and/or output for receiving and/or supplying data to the host system 20, as is known to those of skill in the art. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel Interface, etc.

The magnetic tape cartridge 11 may be inserted in the tape drive 10, and loaded by the tape drive so that one or more tape heads 23 of the recording system, comprising read and/or write heads, transfer data by reading and/or writing data with respect to the magnetic tape data storage media 14 as the tape is moved longitudinally by one or more motors 25. The magnetic tape data storage media comprises a plurality of parallel tracks, or groups of tracks, called a "wrap".

Figure 2:
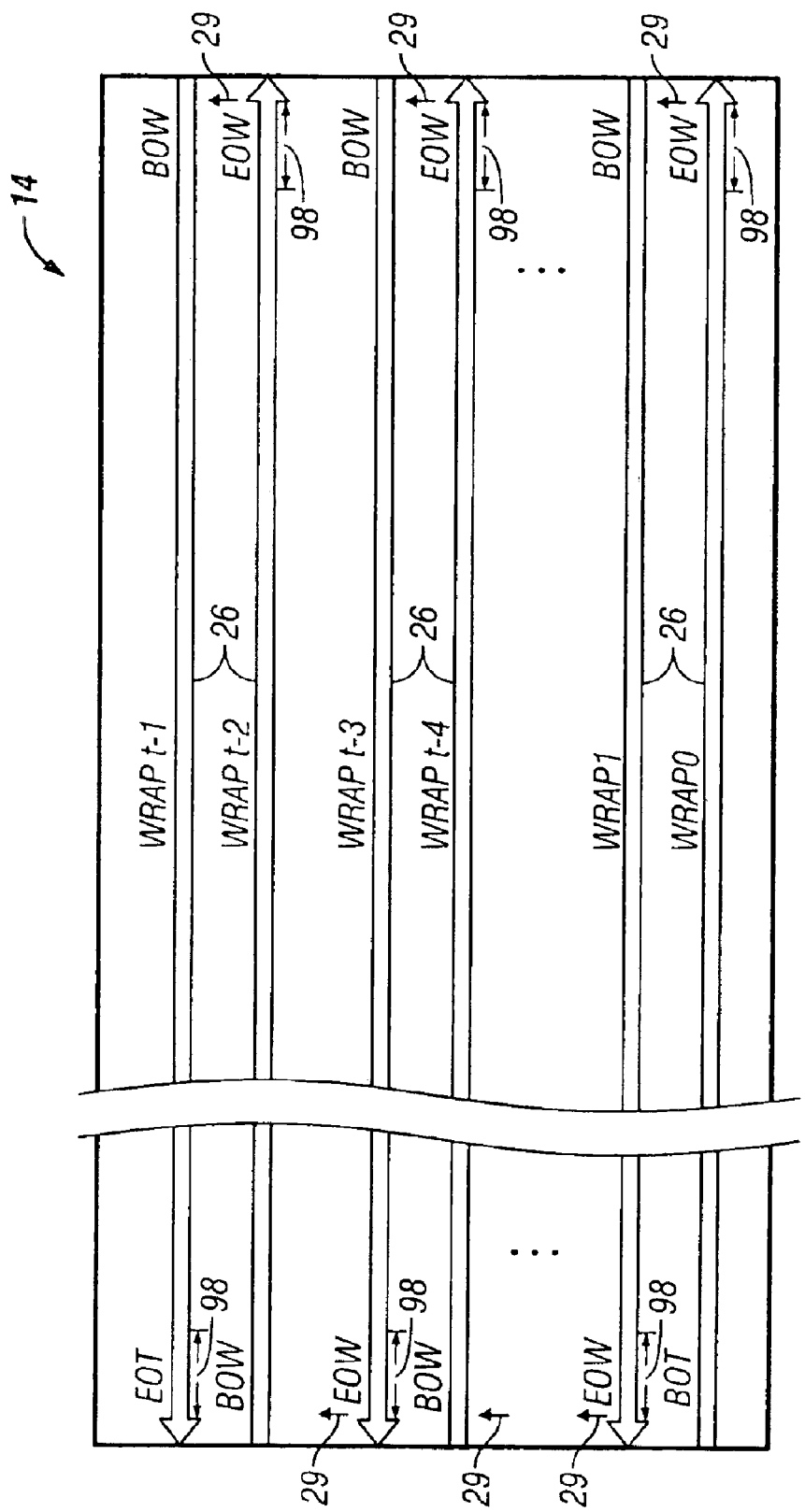
FIG. 2 is diagrammatic illustration of an example of magnetic tape data storage media of FIG. 1 with a serpentine track arrangement.

Referring additionally to FIG. 2, in some formats, such as the LTO format, discussed above, the tracks are arranged in a serpentine back and forth pattern of separate wraps 26, as is known to those of skill in the art. The arrangement of FIG. 2 is diagrammatic only. Each wrap 26 typically comprises a number (such as 8) parallel tracks which are interlaced, such that the read and/or write heads of the tape head 23 of the recording system transfer data simultaneously at some or all of the heads in parallel, and such that the tape head is moved only a small distance to another wrap 26. Further, the wraps 26 may be arranged in an order other than the sequential order depicted in FIG. 2.

Also as known to those of skill in the art, the recording system comprises a wrap control system 27 to electronically switch to another set of read and/or write heads, and/or to seek and move the tape head 23 laterally of the magnetic tape, to position the tape head read and/or write heads at a desired wrap 26, and, in some embodiments, to track follow the desired wrap. The wrap control system may also control the operation of the drive system motors 25 through motor drivers 28, both in response to instructions by the controller 18. A wrap 26 begins at a "beginning of wrap" or "BOW" and ends at an "end of wrap" or "EOW". The first wrap of the tape begins at the "beginning of tape" or "BOT", and the last wrap of the tape ends at the "end of tape" or "EOT". The wraps 26 may progress across the tape in any desired fashion, and not necessarily in sequential order as illustrated in FIG. 2. Also, the tape may be divided into partitions, such that an end of wrap "EOW" and beginning of wrap "BOW" may occur at the end of a partition rather than at the physical end of the magnetic tape data storage media 14.

When the tape head 23 reaches an end of wrap "EOW", the wrap control 27 shifts the tape head 23 laterally, as illustrated by arrow 29, and the drive system 25, 28 stops the movement of the magnetic tape data storage media 14, which had been in the direction toward the end of wrap, and reverses the direction of the tape movement at the beginning of wrap "BOW" for the next wrap.

Controller 18 also provides the data flow and formatting of data to be read from and written to the magnetic tape data storage media 14, employing a buffer 30, which may comprise one or buffers, and a recording channel 32, supplying data to and reading data from the read and/or write heads of the tape head 23, as is known to those of skill in the art.

As discussed above, the data is typically supplied from a host 20 at an input 21 to the tape drive and to one or more data buffers 30 and buffered while being written to the magnetic tape data storage media 14 by the magnetic tape drive. The speed at which the data is supplied to the data buffer 30 may not match the speed or data rate of the magnetic tape drive in writing data to the magnetic tape data storage media 14. Similarly, data is typically read from the magnetic tape data storage media 14 and supplied to the data buffer 30 and supplied from the data buffer to the host 20 at an output 21. The speed at which data is read from the magnetic tape data storage media 14 and supplied to the buffer 30 may not match the speed or data rate at which the data is transferred from the buffer 30 to the host 20 at the output 21 of the tape drive.

The effective data fill and/or empty rate for the data buffer, and the drive data rate are defined as the average data rate after data compression, and may include data formatting. The average data rate may have to account for the command phase, the delay from one command to the next, gaps between bursts, and application program overhead. These factors may differ substantially between the effective data fill and/or empty rate for the data buffer, and the drive write data rate, and the drive read data rate.

In accordance with the present invention, the magnetic tape drive 10 comprises a drive system 25, 28 with a plurality of stepped operational speeds for reading and/or writing data to magnetic tape data storage media. Further, the magnetic tape drive is capable of conducting a backhitch of the magnetic tape data storage media 14 with forward acceleration of the magnetic tape data storage media to a desired speed by the time it reaches a target.

Figure 3:
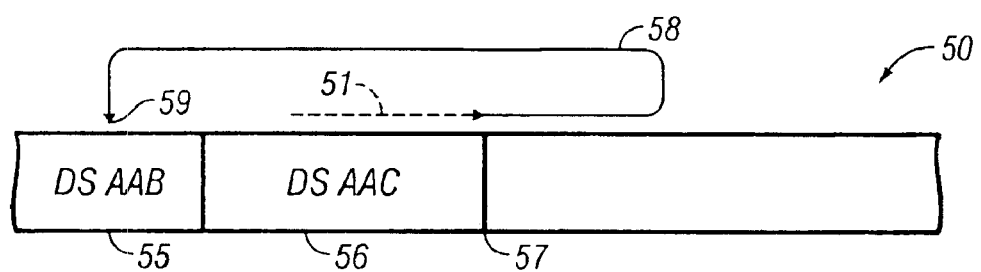
FIG. 3 is a diagrammatic illustration of a repositioning part of a backhitch at a track of the magnetic tape data storage media of FIG. 2, in accordance with an embodiment of the present invention.

Referring additionally to FIG. 3, in a backhitch operation, the magnetic tape drive is initially writing data or reading data with respect to a wrap 50, as illustrated by dashed line 51 with respect to data sets 55 and 56. The writing or reading is stopped at point 57, and the backhitch begins by slowing the forward motion of the tape such that the tape is stopped and the direction of motion is reversed, as illustrated by solid line 58. The reverse motion continues until the magnetic tape data storage media is repositioned to a point 59 sufficiently far upstream of the point 57 at which writing or reading stopped, that the tape can be accelerated to the writing or reading speed and writing or reading can resume at the point 57 at which the writing or reading had stopped.

Figure 4:
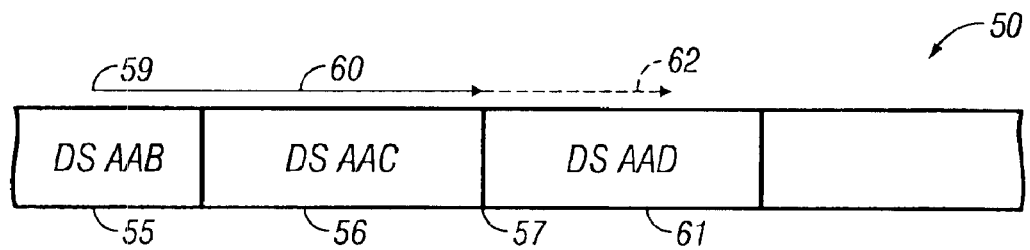
FIG. 4 is a diagrammatic illustration of an acceleration part of a backhitch at a track of the magnetic tape data storage media of FIG. 2, in accordance with an embodiment of the present invention.

Referring additionally to FIG. 4, a point at substantially the point 57 at which the writing or reading stopped becomes a target of a forward acceleration to an operational speed. Beginning at the upstream reposition point 59, the forward motion of the magnetic tape data storage media comprises accelerating the magnetic tape data storage media to the target 57, as illustrated by solid line 60, to reach an operational speed by the time it reaches the target such that writing or reading may begin at the target 57, for example, writing or reading the next data set 61, as illustrated by dashed line 62.

As discussed above, if during writing, the data is supplied to the data buffer at a fill rate which is less than the write data rate of the magnetic tape drive, the data buffer empties and the magnetic tape drive stops writing; the magnetic tape drive backhitches and repositions the magnetic tape data storage media in anticipation of the next write trigger; the magnetic tape drive waits for the data buffer to fill to a point that writing may resume, the magnetic tape drive resumes forward motion to a target position for resumption of the write sequence; and resumes writing at the target position which is the point at which the writing stopped. If the write data is supplied to the data buffer at a fill rate which is greater than the data rate of the magnetic tape drive, the data buffer becomes full, and the host or system which is supplying the data held off from supplying new data.

Similarly, when reading data from the magnetic tape data storage media, if the drive data rate is higher than the rate at which data is transferred from the data buffer to the host system, the data buffer may fill and the magnetic tape drive stops reading; the magnetic tape drive backhitches and repositions the magnetic tape data storage media in anticipation of resumption of the read sequence; waits for the data buffer to empty to a point that there is sufficient room in the buffer to resume reading data from the magnetic tape data storage media; the magnetic tape drive resumes forward motion to a target position for resumption of the read sequence; and resumes reading at the target position which is the point at which the reading stopped. If the read data is supplied to the data buffer from the magnetic tape data storage media at a rate which is less than the effective data rate of the host, the data buffer empties, and the host or system to which the data is being transferred is forced to stop accepting new data at that rate.

Such backhitching is often called "natural" backhitching.

Excessive backhitching may reduce the performance of the magnetic tape drive if the buffer fills with write data, or empties of read data, during the backhitch, and wears both the magnetic tape drive and the magnetic tape data storage media.

Performance is lost if the data fill and/or empty rate is greater than the drive data rate. If, in writing, the data is supplied to the data buffer at a fill rate which is greater than the write data rate of the magnetic tape drive, the data buffer can become full, and the host or system which is supplying the data is held off from supplying new data, reducing the drive performance. When reading data from the magnetic tape data storage media, if the rate at which data is transferred from the data buffer to the host system is greater than the drive data rate, the data buffer may empty and the host or system to which the data is being transferred is forced to stop accepting new data at that rate, reducing the drive performance.

The present invention, in one embodiment, comprises data storage logic, e.g. of controller 18 of FIG. 1, of the stepped operational speed magnetic tape drive 10 which estimates the effective data fill and/or empty rate for the data buffer 30 with respect to the input and/or output interface 21. The data storage logic estimates the drive data rate for transferring data with respect to the data buffer 30 and the magnetic tape data storage media 14 at the current stepped operational speed of the magnetic tape drive, e.g. by looking up or referencing the previously measured drive data rate from a table. The data storage logic estimates, from the effective data fill and/or empty rate for the data buffer 30 and the drive data rate, the time cost to continue to operate the magnetic tape drive at the current stepped operational speed from a target to the next end of wrap. The time cost to continue to operate the magnetic tape drive at the current stepped operational speed encompasses likely stop and backhitch actions required to match the drive data rate and the effective data fill and/or empty rate for the data buffer 30. The data storage logic further estimates, from the effective data fill and/or empty rate for the data buffer 30 and a data rate for transferring data with respect to the magnetic tape data storage media of at least one higher stepped operational speed of the magnetic tape drive, together with a forced backhitch of the magnetic tape drive, the time cost to force the backhitch of the magnetic tape data storage media and change the stepped operational speed by a target to the higher stepped operational speed and to operate the magnetic tape drive at the higher stepped operational speed from the target to the next end of wrap; and determines the lesser of the time costs. The time cost of the changed operational speed also encompasses likely stop and backhitch actions required to match the drive data rate at the changed operational speed, and the effective data fill and/or empty rate for the data buffer 30.

By forcing the backhitch of the magnetic tape data storage media and changing the stepped operational speed at a target to a higher stepped operational speed, and operating the magnetic tape drive at the higher stepped operational speed from the target to the next end of wrap, the host or system supplying the data may be able to operate in a more continuous manner. Further, the number of unforced or "natural" backhitch actions may be substantially reduced, such that the forced backhitch may comprise the lesser of the time costs.

Various aspects of the present invention are illustrated with reference to FIG. 5, beginning at step 80.

In one embodiment, the time cost estimates are conducted on a periodic basis; as illustrated by step 82. In one example, the buffer 30 of FIG. 1 is arranged in segments, for example, of substantially the size to comprise the data of a data set, such as data sets 55, 56, or 61 of FIGS. 3 and 4. The periodic basis may comprise transferring one segment of data with respect to the magnetic tape data storage media. Alternatively, the periodic basis may comprise transferring a predetermined number of segments of data. Still alternatively, if the magnetic tape data storage media comprises a servo system having an indication of length, the periodic basis may comprise a specified length of tape.

Figure 5:
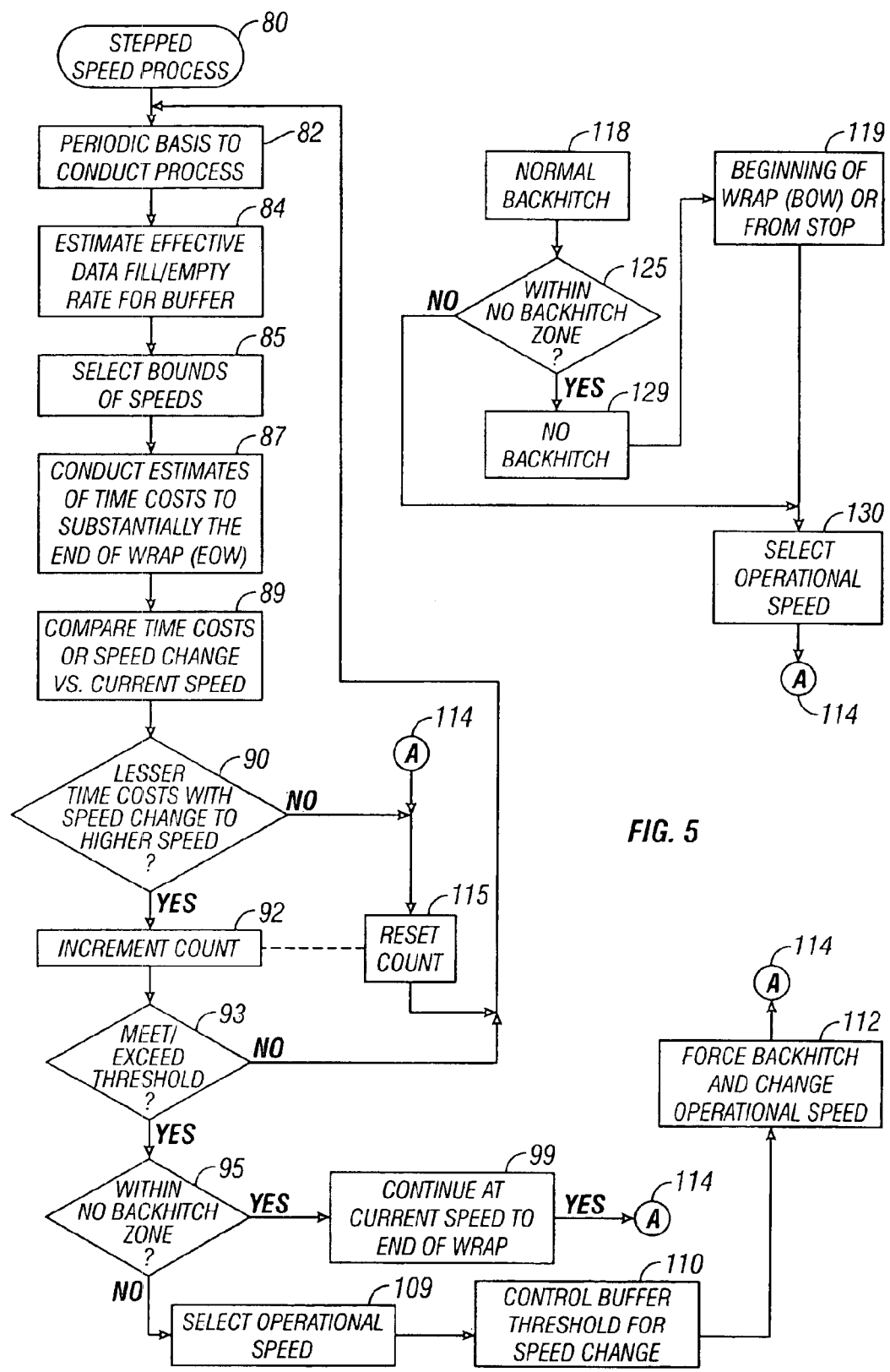
FIG. 5 is a flow chart depicting an embodiment of the present invention for operating the magnetic tape drive of FIG. 1

The estimation of the effective data fill and/or empty rate for the data buffer 30 with respect to the input and/or output 21 is conducted in step 84 of FIG. 5. The effective data fill and/or empty rate for the data buffer 30 with respect to the input and/or output 21 comprises the average data rate after compression, etc., as discussed above, and is related to the data rate of the host 20 of FIG. 1, the data transfer rate of the data bus system(s) between the host 20 and the interface 21, and the data transfer rate of the input and/or output of the interface 21 with respect to the data buffer 30. The effective data rate for writing data from the host may be different from the effective data rate in reading data from the buffer to the host.

Referring to FIGS. 1 and 5, in one example, the estimate of step 84 comprises a weighted average of the effective data fill and/or empty rate for the data buffer 30 with respect to the input and/or output 21 for a certain number of periods of step 82. In another example, the estimate of step 84 comprises a moving average of the effective data fill and/or empty rate for the data buffer 30 with respect to the input and/or output 21 for a certain number of periods of step 82. In another example, the estimate comprises the most recent effective data fill and/or empty rate, for example, for a given number of buffer segments.

Step 85 illustrates an optional preferred embodiment, and comprises selecting upper and higher bounds of speeds of the magnetic tape drive, for example, each of the bounds comprising a stepped operational speed above and below the effective data fill and/or empty rate for the data buffer 30 with respect to the input and/or output 21. One of the bounds may comprise the current operational speed of the magnetic tape drive, or both bounds may be above or below the current operational speed, for example, depending on the changes to the effective data rate of the host 20, or the data transfer rate of the data bus system(s) between the host 20 and the interface 21.

In one embodiment, if step 85 indicates that the bounds would comprise operational speeds less than the current operational speed, no further action is taken at that time, since a forced backhitch would slow the data transfer even more.

Further, if step 85 indicates that the drive is already operating at the highest stepped operational speed, or that no higher speed is available, and that the bounds would comprise the current operational speed or higher if available, no further action is taken at this time. Hence, there is not any available higher stepped operational speed.

Alternatively, step 85 comprises selecting a single higher stepped operational speed, if available, assumed to match the effective data fill and/or empty data rate of the data buffer 30.

Still alternatively, step 85 comprises selecting a number, or all, available higher stepped operational speeds.

In step 87, the data storage logic estimates, from the drive data rate, the time cost to continue to operate the magnetic tape drive at the current stepped operational speed from a target to substantially the next end of wrap; and estimates, from the effective data fill and/or empty rate for the data buffer 30 and a data rate for transferring data with respect to the magnetic tape data storage media of at least one higher stepped operational speed of the magnetic tape drive, if any, from step 85, together with a forced backhitch reposition of the magnetic tape drive, the time cost to force the backhitch and change the stepped operational speed to the higher stepped operational speed and to operate the magnetic tape drive at the higher stepped operational speed from the target to substantially the next end of wrap. For example, if both bounds from step 85 are for a higher operational speed than the current operational speed, estimates of the time costs for both are made, together with the time cost for the current operational speed. If only one bound from step 85 is higher than the current operational speed, only the time cost for the higher operational speed may be conducted, together with the time cost for the current operational speed.

In step 89, the time cost(s) of the operational speed(s) for the higher stepped operational speed(s) are compared to the time cost of the current operational speed.

In step 90, if the time cost of the current operational speed is the lesser time cost, the process cycles back to the beginning step 82. In one embodiment of the present invention, if the time cost of a higher stepped operational speed is the lesser time cost, the backhitch may be conducted to change to the higher stepped operational speed.

In another embodiment, a threshold must be met before the backhitch is performed, represented by optional steps 92 and 93. For example, a threshold count is monitored. Each successive instance that the comparison of steps 87 and 89 is made and the time cost of a higher stepped operational speed is the lesser time cost, a count is incremented in step 92. Step 93 determines whether the incremented count meets or exceeds a threshold. If the threshold is not met or exceeded, the process cycles back to the beginning step 82, and the current stepped operational speed is selected without regard to which estimated time cost comprises the lesser of the estimated time costs. If the periodically taken estimates continue to result in indicating that the time cost of a higher stepped operational speed is the lesser time cost, the incremented count of step 92 may meet or exceed the threshold of step 93.

In step 90, if the current speed is determined to have the lesser time cost, the incremented count of step 92 is reset in step 115. This breaks the chain of successive instances that the higher stepped operational speed has the lesser time cost, discussed above.

In one embodiment, if the threshold of step 93 is met and/or exceeded, the determined lesser time cost is selected which comprises forcing the backhitch and changing the stepped operational speed to the higher stepped operational speed.

In one embodiment, represented by step 95, additionally, the distance to an end of wrap is determined, and, if the distance to an end of wrap is less than a predetermined distance, as an example, the data storage logic prevents forcing a backhitch in step 99, and prevents a change of the stepped operational speed to a different stepped operational speed. The predetermined distance may also be referred to as a "No Backhitch Zone" or "NBZ". Referring to FIG. 2, for example, if the magnetic tape data storage media comprises a servo system having an indication of length, the predetermined distance or NBZ may comprise a specified distance 98, such as 3 meters from the end of wrap "EOW". Alternatively, markers may be provided at the predetermined distance from the end of wrap. If the distance to the end of wrap is less than the predetermined distance, the forced backhitch not conducted. In step 99, the data storage logic continues the read or write operation at the current operational speed to the end of wrap. In one embodiment, the process proceeds, via connector 114, to step 115, where the count is reset. In another embodiment, the count is reset after the end of wrap is reached and a shift is made to the beginning of the next wrap, as will be discussed.

If the distance to the end of wrap is greater than the predetermined distance, the backhitch is conducted. First, step 109 selects the new higher operational speed having the lesser time cost. In one embodiment, step 110 is conducted, in which the data capacity threshold of the buffer is controlled to establish the timing of the backhitch of the magnetic tape. For example, if the data buffer 30 of FIG. 1 is low on data from the host to be written, or has a high level of read data to be transferred to the host system, the backhitch may be conducted at a slow speed, or the tape may be stopped during the backhitch to wait until sufficient data transfer between the host 20 and the buffer 30 occurs so that the buffer is sufficiently full of write data or has sufficient space for read data to allow a streaming action, or to allow a data transfer between the magnetic tape data storage media 14 and the buffer 30 to take place with a reduced number of "natural" backhitches at the changed stepped tape speed.

Once the control is set, in step 112, the data storage logic forces the backhitch of the magnetic tape data storage media as depicted in FIG. 3, such that the writing or reading is stopped at point 57. The forced backhitch begins by slowing the forward motion of the tape such that the tape is stopped, and the direction of motion is reversed, as illustrated by solid line 58. The reverse motion continues until the magnetic tape data storage media is repositioned to a point 59 sufficiently far upstream of the point 57 at which writing or reading stopped, that the tape can be accelerated to the changed writing or reading speed and writing or reading can resume at the point at which the writing or reading had stopped.

Then, the tape may be stopped during the backhitch, and, at the time dictated by step 110 of FIG. 5, the forward acceleration of the magnetic tape data storage media to the target is conducted and the operational speed is changed to the higher stepped operational speed by the time a target is reached. Referring to FIG. 4, a point at substantially the point 57 at which the writing or reading stopped, becomes a target of the forward acceleration. Beginning at the upstream reposition point 59, the forward motion of the magnetic tape data storage media comprises accelerating the magnetic tape data storage media toward the target 57, as illustrated by solid line 60, to the changed operational speed such that writing or reading may begin at the target 57, for example, writing or reading the next data set 61, as illustrated by dashed line 62, at the changed operational speed.

The process continues, via connector 114, to step 115 which resets the count of step 92, and cycles back to step 82 to begin the stepped speed process again.

FIG. 5 also illustrates a "natural" backhitch 118, which is not forced, and a beginning of wrap "BOW" or the situation where the magnetic tape drive is operating from a stop 119. If a backhitch is to be initiated, in accordance with the present invention, step 125 is conducted, which is similar to step 95. For example, the distance to an end of wrap is determined, and, if the distance to an end of wrap, or "NBZ", is greater than a predetermined distance, the backhitch operation is conducted.

If the distance is less than the predetermined distance, as an example, the data storage logic prevents the "natural" backhitch in step 129, and, if the operation comprises a write operation, the operation is treated as an end of wrap "EOW" operation. In one embodiment, the magnetic tape drive stops any further writing on the current wrap and, instead, repositions to the start of the next beginning of wrap. In another embodiment, the data is written at the current rate, and the end of data is treated as an end of wrap, at which the writing is stopped. In a read operation, the operation continues at the current stepped operational speed to the physical end of wrap.

If the normal backhitch is not within the "no backhitch zone" in accordance with step 125; if the backhitch, whether normal or forced is within the "no backhitch zone" and the end of wrap operation has occurred, leading to a beginning of wrap at the next wrap, in accordance with steps 99 or 129; if a normal beginning of wrap is conducted, or the tape is beginning from a stop in accordance with step 119; then, in step 130, a stepped operational speed is selected that best matches the effective data fill and/or empty rate for the data buffer 30 of FIG. 1 with respect to the host 20. The process continues, via connector 114, to step 115 which resets the count of step 92, and cycles back to step 82 to begin the stepped speed process again.

In step 87, the term "substantially the next end of rap" may comprise the actual end of wrap (EOW), may comprise the beginning of the no backhitch zone (NBA), or may comprise any predetermined point of the magnetic tape data storage media that is near the actual end of wrap.

The illustrated components of the data storage logic, and recording system and magnetic tape drive of FIG. 1, and the arrangement of the magnetic tape data storage media of FIGS. 2, 3 and 4 may be varied, combined, or combined functions may be separated, as is known to those of skill in the art. The illustrated steps of FIG. 5 may be altered in sequence, omitted, or other steps added, as is known to those of skill in the art.

As an appendix, an example of an embodiment of pseudo-code for the data storage logic is provided as follows:
Nomenclature & Constants which can be Calculated One Time (e.g. at Compile)
Establish Periodic Basis as a function of buffered data (e.g. Every 1 MB of compressed customer data). Each will be referred to as a "segment" in the buffer. The buffer will consist of multiple segments.
A dataset (DS) is the unit of data on tape which corresponds to buffer segment. Actual lengths of a DS may vary depending on on-the-fly corrections.
Dds is the nominal length of a dataset on tape.
A dataset separator (DSS) is a synchronize signal used to deliniate datasets on tape.
Data is generally written between Beginning of Wrap (BOW) and End of Wrap (EOW).
A backhitch (BH) is the servo action required to return back to the last point of reading or writing.
Generally, to prevent data from being written outside of wrap boundaries (in the event of needed error recovery procedures), a special guard region at EOW is defined to provide margin. This guard region is refered to as the No Backhitch Zone (NBZ).
Ddss,eow is the minimum length of DSS written at the End of a Wrap (EOW).
N,max is the maximum number of datasets which will fit in buffer.
A,max is the maximum longitudinal acceleration of tape in m/s2.
D,svo,acq is the servo signal acquisition distance in meters.
V[j] is the velocity at R/W speed j in m/s, where j is from 1 to the number of stepped speeds implemented.
Tfs[j] is the time required to accelerate to V[j] in seconds
Dfs[j]=A,max*Tfs 2[j]/2 is the distance travelled during acceleration.
Tacc[j] is Tfs[j] plus the time required to traverse the D,svo,acq @ V[j]=Tfs[j]+D,svo,acq/V[j]
Tbh[j] is time required for a backhitch at V[j], including servo acquistion time in seconds=4*Tfs[j]+2*D,svo,acqV[j]
Tdecel[j] is time required to decelerate & traverse DSS @ EOW, =Tfs[j]+Ddss,eow/V[j]
Twr,ds[j] is time to write a DS in milliseconds=Dds/V[j].
Rwr,ds[j] is the rate of DS writing in DS/s=1000/Twr,ds[j].
FDRH is the Filtered Data Rate from the Host in buffer Segments/s
FDFT is the Filtered Dataset Fill Time in ms/Segments
LDFT is the Last Dataset Fill Time in ms/Segments
Q is the Infinite Impulse Response (IIR) filter parameter, a number which is unitless
Npause is the total number of Segments in buffer when Pause threshold reached
At the Pause Threshold host write or read transfers will be temporarily suspended until empty segments (for writes) or filled segments (for read) are available.
Npresent is the total number of full Segments in buffer at the present time
D,eow is the Length to End of Wrap from the current position.
T,eow is the total time required to get to write D,eow
NBZ is the length of the No Backhitch Zone upstream of EOW in meters.
Calculations:
An Impulse Response function is used to calculate the filtered segment fill time: FDFT=FDFT*(Q-1)/Q+LDFT/Q=FDFT+(LDFT-FDFT)/Q;
The filtered data rate from host is calculated: FDRH=1000/FDFT; This is the effective dataset fill rate taking into account the host-drive interface rate and the compression ratio.
Select the Stepped Velocity Settings which Comprise the Upper and Higher Bounds of the Effective Host Dataset Fill Rate.

---

If (FDRH>Rwr,ds[max]), then use V[max] which is max. speed
Else if (FDRH<Rwr,ds[min]), then use V[min] which is min. Speed
Else select the two indices of DS rates, a and b, which give the closest Rwr,ds to FDRH,
   If Rwr,ds[a] = FDRH choose 'a'    // if exact natch,
   Else if Rwr,ds[b] = FDRH choose 'b'    // if exact match,
   Else FDRH is somewhere between the two:

---

Calculation for Best Speed Selection if Beginning from a Stop (Select the Velocity with Lesser Cost Results.) if Rwr,ds[a]>FDRH>Rwr,ds[b] before the reposition is begun:
1. Calculate the cost (per required backhitch) of using (V[a] instead of V[b]: t1=(Dfs[a]-Dfs[b])/V[a].
2. Calculate the cost needed to wait to maximize allowable buffer space. If buffer full (i.e. The host has been PAUSE'd, set t2=0 & goto step3; else calculate the ideal wait time before acceleration: t2=(Npause-Npresent)/FDRH-Tacc[a]. If t2 negative, set t2=0. t2 is the estimated wait time before we would begin acceleration up to begin writing. Npause is the buffer segment count at which the host transfer will be temporarily paused. Npresent is the present buffer segment count.
3. Calculate the cost, t3, required to drain the buffer from PAUSE'd to no more Segments available to write: (note: the buffer drain rate is a function of the selected Velocity: if the native rate associated with the selected stepped velocity is greater than the effective host dataset fill rate, the drive will (naturally) tend to empty the buffer. If the native rate associated with the selected stepped velocity is less than the effective host dataset fill rate, the drive will never be able to empty the buffer. Instead, the host transfer will be paused to allow for some of the buffer to empty.)
t3=Max[Npause/Rwr,ds[a]−FDRH),t3,max]; where t3, max is the time to traverse from BOW to EOW at the selected velocity.

4. Calculate the estimated write distance until the next empty event and limit the result to the length to end-of-wrap.

$$d4 = \text{Max}[t3*V[a], Deow]$$

5. Calculate the estimated number of backhitches n5, an integer=floor(D,eow/d4) The drive will have to backhitch every time the buffer is emptied. (Note: no backhitches occur if the buffer is never emptied.)
6. Calculate the cost waiting to fill buffer: t6=t3+max(Tbh [a], (Npause/FDRH)) This cycle time includes the time it takes to empty plus the time it takes to complete the backhitch.
7. Calculate the cost required to write last datasets at EOW $$\text{If}(t7 = t3 * \text{frac}(D, eow/d4) + ((\text{frac}(D, eow/d4) * Npause) > Nafter, BH)$$

Then (frac(D,eow/d4)*N pause−N after, BH)/FDRH: else 0;

Where Nafter,BH=FDRH*Tbh[a]. This is the number of buffer segments accumulated during the backhitch operation at the selected stepped velocity index, 'a'.
8. The cost writing the trailing DSS @ EOW plus the final deceleration Tdecel[a]. This represents the time to complete the write sequence in the current wrap.
9. Calculate total cost to end-of-wrap.

```
If in NBZ then
    T,a = (D,eow/d4)*(t1 + t2 + Tacc[a] + D,eow/V[a]+ Tdecel[a]);
} else
    T,a = t1 + t2 + Tacc[a] + n5*t6 + t7 + Tdecel[a];
}
```

For stepped velocity index 'b' (i.e. Drive write rate is less than host dataset fill rate) we begin ramping speed immediately since buffer will fill as writing, calculate:
1. Calculate cost to write to EOW, T,wr,eow=D,eow/V[b]
2. Total cost is T,b=Tacc[b]+T,eow+Tdecel[b] time includes time to accelerate to speed, time to reach end-of-wrap at select stepped velocity index, and time to decelerate once the end-of-wrap is reached.

Select the Appropriate Stepped Velocity Index which Calculates to Give the Lowest Cost (Shortest Time) to the End-of-Wrap.

If cost of operating at speed 'a' is less than cost of operating at speed 'b', T,a<T,b, then operate at stepped speed index 'a', else operate at stepped speed index 'b', call selected speed 's'

Calculation for Determining if We Should Stop and Force a Backhitch to Go to the New Selected Speed (s) if We are Presently Writing at Speed 'p'

For Write operations,
if the selected stepped velocity is less than the current stepped velocity, then the drive will naturally tend to empty forcing a backhitch at which time the stepped velocity can be adjusted (if still necessary)
else
1. Calculate the time required to perform a backhitch ending operationg at speed 'p' and starting at speed 's'): t1=Tfs [p]+3*Tacc[s]+(Dfs[s]−Dfs[p])/V[s].

2. Calculate the cost to EOW if the selected speed is 'b':

$$T,s = t1 + T,eow[s] + Tdecel[s];$$

} else Calculate the cost to EOW if the selected speed is 'a':
1. calculate the estimated wait time before we would begin acceleration up to begin writing (t2).
  1a. If the buffer is already full, then time to start is now.
  1b. If the number of segments filled during a backhitch is greater than the Pause threshold, then time to start is now.
  1c. Else calculate the estimated wait time before we would begin acceleration up to begin writing $$t2 = (Npause − Nest)/FDRH − Tacc[s];$$

If (t2<0) t2=0;}
1 Calculate the time, t3, required to drain the buffer from PAUSE'd to no more DS available to write:

$$t3 = \text{MAX}[Npause/(Rwr, ds[a] − FDRH), D, eow/V[a]]$$

1 Calculate the estimated write distance and limit $$D4 = \text{MAX}[t3 * V[a], D, eow]$$

2 Calculate the estimated number of backhitches n5, an integer=floor(D,eow/d4)
3 Calculate the cycle time may need wait to fill buffer: t6=t3+max(Thh[s], (Npause/FDRH))
4 Calculate the time required to write residual segments at end of wrap, t7:
  4a. Calculate the number of segments accumulated during a backhitch operation: Nafter,BH= FDRH*Tbh[s]
  4b. Residual Segment Count=MIN[remainder of ((D, eow/d4)*Npause−Nafter,BH)/FDRH), 0].
  4c. Time required to write last datasets of wrap, t7=t3*frac(D,eow/d4)+Residual Segment Count.
1 The required time to write the trailing DSS @ EOW plus the final decel. is Tdecel[s]
2 Calculate total time.

```
If in NBZ,
    T,s = (D,eow/d4)*(t1 + t2 + Tacc[s] + D,eow/V[s]+ Tdecel[s]);
} else
    T,s = t1 + t2 + Tacc[s] + n5*t6 + t7 + Tdecel[s];
}
```

Calculate cost of continuing at present speed, 'p'
1. Calculate cost to write to EOW, T,wr,eow[p]=D,eow/V[p]
2. Total cost (time) is T,p=Twr,eow[p]+Tdecel[p]
Determine if the Trend Remains Constant Over a Minimum Successive Dataset Count
  if cost of selected speed is less than cost of present speed, T,s<T,p for a count greater than some number of minimum segments, then force a backhitch to change over to selected speed 's'.
  If cost of selected speed is greater than cost of present speed, T,x>T,p, at any time then reset count and continue to operate at preset speed 'p'>.
  }
}
For a read operation the same condition (the FDRH increases dramatically after we begin operation at a given speed) produces the opposite buffer condition—that his the buffer goes empty and we thus begin to hold off the host for lack of data. Thus the calculation is a slightly different one:
Calculation for Determining if We Should Stop and Force a Backhitch to Go to 's' if We are Presently Reading at Speed 'p'
If the selected stepped velocity is less than the current stepped velocity, then the drive will naturally tend to fill the buffer, forcing a backhitch at which time the stepped velocity can be adjusted (if still necessary)
1. Calculate the time required to perform a backhitch ending operationg at speed 'p' and starting at speed 's'): t1=Tfs[p]+3*Tacc[s]+(Dfs[s]–Dfs[p])V[s].
2. Calculate the cost to EOW if the selected speed is 'b':

$T,s=t1+Trd,eow[s]+Tdecel[s];$

} else Calculate the cost to EOW if the selected speed is 'a':
1. Calculate time to accelerate to begin reading (t2):
   1a. Number of segments accumulated during backhitch:

$Nest=Npresent-FDRH*t1;$

1b. If the number of segments accumulated will result in fewer than is the threshold to hold off sending to the host, ((Nest<Nhold) then t2=0;
   1c. Else calculate the estimated wait time before we would begin acceleration up to begin reading:

$t2=(Nest-Nhold)/FDRH-Tacc[s];$

If (t2<0) t2=0;}
1 Calculate the time, t3, required to fill the buffer from HOLD to no more DS available to fill with a read (forces backhitch):

$t3=MAX[(Nmax-Nhold)/(Rrd,ds[s]-FDRH), D,eow/V[s]]$

1 Calculate the estimated write distance and limit $d4=MAX[t3*V[a],D,eow]$

2 Calculate the estimated number of backhitches n5, an integer=floor(D,eow/d4)
3 Calculate the cycle time may need wait to empty buffer: t6=t3+max(Tbh[s], ((Nmax-Nhold)/FDRH)))
4 Calculate the time required to read last datasets of wrap
   4a Calculate the number of segments accumulated during a backhitch operation:

$Nafter, BH=FDRH*Tbh[s]$

4b. Redisual Segment Count=MIN[remainder of ((D,eow/d4)*Npause−Nafter,BH)/FDRH), 0].
   4c. Time required to read last datasets of wrap, t7=t3frac(D,eow/d4)+Residual Count.
1 The required time to read the trailing DSS @ EOW plus the final decel. is Tdecel[s]
   Calculate total cost (time) of switching to selected speed, s:

---

If in NBZ, then
   T,s = (D,eow/d4)*(t1 + t2 + Tacc[s] + D,eow/V[s]+ Tdecel[s]);
} else
   T,s = t1 + t2 + Tacc[s] + n5*t6 + t7 + Tdecel[s];
}

---

Calculate cost of continuing at present speed, 'p'.
1. Calculate cost to write to EOW, T,wr,eow=D,eow/V[p]
2. Total cost is T,p=Twr,eow+Tdecel[p]
Determine if the Trend Remains Constant Over a Minimum Successive Dataset Count
if cost of selected speed is less than present speed, T,s<T,p, for a count greater than some number of minimum segments, then force a backhitch to change over to selected speed, 's'.
If cost of selected speed is greater than present speed, T,s>T,p, at any time then, reset count and continue to operate at present speed, 'p'.>
   }
}
While the preferred embodiments of the present invention have been illustrated in detail, it should be apparent that modifications and adaptations to those embodiments may occur to one skilled in the art without departing from the scope of the present invention as set forth in the following claims.

What is claimed is:

1. Data storage logic for controlling a magnetic tape drive for storing data on a magnetic tape data storage media in a plurality of wraps, which comprise a plurality of parallel longitudinally recorded tracks, said magnetic tape drive having at least one input and/or output, having at least one data buffer, and having a plurality of stepped operational speeds for moving said magnetic tape data storage media longitudinally with respect to at least one tape head for transferring data by reading and/or writing data with respect to said magnetic tape data storage media, said magnetic tape drive capable of conducting a backhitch of said magnetic tape data storage media, said data storage logic:
   estimates the effective data fill and/or empty rate for said at least one data buffer with respect to said input and/or said output;
   estimates the drive data rate for transferring data with respect to said at least one data buffer and said magnetic tape data storage media at the current stepped operational speed of said magnetic tape drive;
   estimates, from said effective data fill and/or empty rate for said at least one data buffer and said drive data rate, the time cost to continue to operate said magnetic tape drive at said current stepped operational speed from a target to substatially the next end of wrap;
   estimates, from said effective data fill and/or empty rate for said at least one data buffer and a data rate for transferring data with respect to said magnetic tape data storage media of at least one higher stepped operational speed of said magnetic tape drive, together with a forced backhitch of said magnetic tape drive, the time cost to force a backhitch of said magnetic tape data storage media and change said stepped operational speed to said higher stepped operational speed and to operate said magnetic tape drive at said higher stepped operational speed from said target to substantially the next end of wrap; and
   determines the lesser of said time costs.

2. The data storage logic of claim 1, additionally:
   monitors a threshold between said time cost of said current stepped operational speed, and a lesser time cost to force said backhitch of said magnetic tape data storage media and change said stepped operational speed to said higher stepped operational speed; and
   if said threshold is met and/or exceeded, selects said determined lesser time cost which comprises forcing said backhitch of said magnetic tape data storage media and changing said stepped operational speed to said higher stepped operational speed; and if said threshold is unmet and/or unexceeded selects said current stepped operational speed without regard to which estimated time cost comprises said lesser of said estimated time costs.

3. The data storage logic of claim 2, wherein said threshold comprises a predetermined count; and wherein said data storage logic conducts said time cost estimates on a periodic basis and wherein said count is incremented at each successive instance that said periodic time cost estimates determines said lesser one of said time costs is said time cost to force said backhitch of said magnetic tape data storage media and change said stepped operational speed; and said count is reset upon forcing said backhitch.

4. The data storage logic of claim 2, additionally:

if said determined lesser time cost comprises said at least one higher stepped operational speed, and said higher stepped operational speed is selected, controlling a threshold of said buffer to establish the timing of said backhitch.

5. The data storage logic of claim 1, additionally comprising determining the distance to an end of wrap, and, if said distance to an end of wrap is less than a predetermined distance, preventing a backhitch.

6. The data storage logic of claim 1, additionally comprising determining two said stepped operational speeds bounding said estimated effective data fill and/or empty rate for said at least one data buffer; and performing said lesser time cost determination with respect to said two operational speeds and said current operational speed.

7. A recording system for a magnetic tape drive for storing data on a magnetic tape data storage media in a plurality of wraps, which comprise a plurality of parallel longitudinally recorded tracks, said magnetic tape drive having at least one input and/or output, having at least one tape head for transferring data by reading and/or writing data with respect to magnetic tape data storage media, and a drive system for moving said magnetic tape data storage media longitudinally with respect to said at least one tape head, said drive system having a plurality of stepped operational speeds, said magnetic tape drive capable of conducting a backhitch of said magnetic tape data storage media, said recording system comprising:

at least one data buffer; and data storage logic:

estimates the effective data fill and/or empty rate for said at least one data buffer with respect to said at least one input and/or output;

estimates the drive data rate for transferring data with respect to said at least one data buffer and said magnetic tape data storage media at the current stepped operational speed of said drive system;

estimates, from said effective data fill and/or empty rate for said at least one data buffer and said drive data rate, the time cost to continue to operate said drive system at said current stepped operational speed from a target to substantially the next end of wrap;

estimates, from said effective data fill and/or empty rate for said at least one data buffer and a data rate for transferring data with respect to said magnetic tape data storage media of at least one higher stepped operational speed of said drive system, together with a forced backhitch of said drive system, the time cost to force a backhitch of said magnetic tape data storage media and change said stepped operational speed to said higher stepped operational speed and to operate said drive system at said higher stepped operational speed from said target substantially to the next end of wrap; and determines the lesser of said time costs.

8. The recording system of claim 7, wherein said data storage logic additionally:

monitors a threshold between said time cost of said current stepped operational speed; and a lesser time cost to force said backhitch of said magnetic tape data storage media and change said stepped operational speed to said higher stepped operational speed; and if said threshold is met and/or exceeded, operates said drive system to force said backhitch of said magnetic tape data storage media and change said stepped operational speed to said higher stepped operational speed; and if said threshold is unmet and/or unexceeded, said data storage logic selects said current stepped operational speed of said drive system without regard to which estimated time cost comprises said lesser of said estimated time costs.

9. The recording system of claim 8, wherein said threshold comprises a predetermined count; and wherein said data storage logic conducts said time cost estimates on a periodic basis and wherein said count is incremented at each successive instance that said periodic time cost estimates determines said lesser one of said time costs is said time cost to force said backhitch of said magnetic tape data storage media and change said stepped operational speed; and said count is reset upon forcing said backhitch.

10. The recording system of claim 8, wherein said data storage logic additionally, if said determined lesser time cost comprises said at least one higher stepped operational speed, and said higher stepped operational speed is selected, controls a threshold of said buffer to establish the timing of said backhitch.

11. The recording system of claim 7, wherein said data storage logic additionally determines the distance to an end of wrap, and, if said distance to an end of wrap is less than a predetermined distance, prevents a backhitch.

12. The recording system of claim 7, wherein said data storage logic additionally determines two said stepped operational speeds bounding said estimated effective data fill and/or empty rate for said at least one data buffer; and performs said lesser time cost determination with respect to said two operational speeds and said current operational speed.

13. A magnetic tape drive for storing data on a magnetic tape data storage media in a plurality of wraps, which comprise a plurality of parallel longitudinally recorded tracks, comprising:

at least one input and/or output;

at least one tape head for transferring data by reading and/or writing data with respect to magnetic tape data storage media;

a drive system for moving said magnetic tape data storage media longitudinally with respect to said at least one tape head, said drive system having a plurality of stepped operational speeds, said magnetic tape drive capable of conducting a backhitch of said magnetic tape data storage media;

at least one data buffer; and data storage logic:

estimates the effective data fill and/or empty rate for said at least one data buffer with respect to said at least one input and/or output;

estimates the drive data rate for transferring data with respect to said at least one data buffer and said magnetic tape data storage media at the current stepped operational speed of said drive system;

estimates, from said effective data fill and/or empty rate for said at least one data buffer and said drive data rate, the time cost to continue to operate said drive system at said current stepped operational speed from a target to substantially the next end of wrap;

estimates, from said effective data fill and/or empty rate for said at least one data buffer and a data rate for transferring data with respect to said magnetic tape data storage media of at least one higher stepped operational speed of said drive system, together with a forced backhitch of said drive system, the time cost to force a backhitch of said magnetic tape data storage media and change said stepped operational speed to said higher stepped operational speed and operate said drive system at said higher stepped operational speed from said target to substantially the next end of wrap; and determines the lesser of said time costs.

14. The magnetic tape drive of claim 13, wherein said data storage logic additionally:

monitors a threshold between said time cost of said current stepped operational speed; and a lesser time cost to force said backhitch of said magnetic tape data storage media and change said stepped operational speed to said higher stepped operational speed; and if said threshold is met and/or exceeded, operates said drive system to force said backhitch of said magnetic tape data storage media and change said stepped operational speed to said higher stepped operational speed; and if said threshold is unmet and/or unexceeded, said data storage logic selects said current stepped operational speed of said drive system without regard to which estimated time cost comprises said lesser of said estimated time costs.

15. The magnetic tape drive of claim 14, wherein said threshold comprises a predetermined count; and wherein said data storage logic conducts said time cost estimates on a periodic basis and wherein said count is incremented at each successive instance that said periodic time cost estimates determines said lesser one of said time costs is said time cost to force said backhitch of said magnetic tape data storage media and change said stepped operational speed; and said count is reset upon forcing said backhitch.

16. The magnetic tape drive of claim 14, wherein said data storage logic additionally, if said determined lesser time cost comprises said at least one higher stepped operational speed, and said higher stepped operational speed is selected, controls a threshold of said buffer to establish the timing of said backhitch.

17. The magnetic tape drive of claim 13, wherein said data storage logic additionally determines the distance to an end of wrap, and, if said distance to an end of wrap is less than a predetermined distance, prevents a backhitch.

18. The magnetic tape drive of claim 13, wherein said data storage logic additionally determines two said stepped operational speeds bounding said estimated effective data fill and/or empty rate for said at least one data buffer; and performs said lesser time cost determination with respect to said two operational speeds and said current operational speed.

19. A method for operating a magnetic tape drive for storing data on a magnetic tape data storage media in a plurality of wraps, which comprise a plurality of parallel longitudinally recorded tracks, said magnetic tape drive having at least one input and/or output; having at least one tape head for transferring data by reading and/or writing data with respect to magnetic tape data storage media; having a drive system for moving said magnetic tape data storage media longitudinally with respect to said at least one tape head, said drive system having a plurality of stepped operational speeds, said magnetic tape drive capable of conducting a backhitch of said magnetic tape data storage media; arid having at least one data buffer; comprising the steps of:

estimating the effective data fill and/or empty rate for said at least one data buffer with respect to said at least one input and/or output;

estimating the drive data rate for transferring data with respect to said at least one data buffer and said magnetic tape data storage media at the current stepped operational speed of said drive system;

estimating, from said effective data fill and/or empty rate for said at least one data buffer and said drive data rate, the time cost to continue to operate said drive system at said current stepped operational speed from a target to substantially the next end of wrap;

estimating, from said effective data fill and/or empty rate for said at least one data buffer and a data rate for transferring data with respect to said magnetic tape data storage media of at least one higher stepped operational speed of said drive system, together with a forced backhitch of said drive system, the time cost to force a backhitch of said magnetic tape data storage media and change said stepped operational speed to said higher stepped operational speed and to operate said drive system at said higher stepped operational speed from said target to substantially the next end of wrap; and determining the lesser of said time costs.

20. The method of claim 19, additionally comprising the steps of:

monitoring a threshold between said time cost of said current stepped operational speed; and a lesser time cost to force said backhitch of said magnetic tape data storage media and change said stepped operational speed to said higher stepped operational speed; and if said threshold is met and/or exceeded, forcing said backhitch of said magnetic tape data storage media and changing said stepped operational speed to said higher stepped operational speed; and if said threshold is unmet and/or unexceeded, selecting said current stepped operational speed of said drive system without regard to which estimated time cost comprises said lesser of said estimated time costs.

21. The method of claim 20, wherein said threshold comprises a predetermined count; and wherein said step of monitoring a threshold comprises conducting said time cost estimates on a periodic basis and incrementing said count at each successive instance that said periodic time cost estimates determines said lesser one of said time costs is said time cost to force said backhitch of said magnetic tape data storage media and change said stepped operational speed; and resetting said count upon forcing said backhitch.

22. The method of claim 20, additionally comprising the step of:

if said determined lesser time cost comprises said at least one higher stepped operational speed, and said higher stepped operational speed is selected, controlling a threshold of said buffer to establish the timing of said backhitch.

23. The method of claim 19, additionally comprising the steps of:
  determining the distance to an end of wrap; and
  if said distance to an end of wrap is less than a predetermined distance, preventing a backhitch.

24. The method of claim 19, additionally comprising the step of determining two said stepped operational speeds bounding said estimated effective data fill and/or empty rate for said at least one data buffer; and wherein said step of determining said lesser time cost comprises determining said lesser time cost with respect to said two operational speeds and said current operational speed.

25. A computer program product embodied on a computer-readable medium usable with at least one programmable computer processor having computer readable code embodied therein, said at least one programmable computer processor for controlling a magnetic tape drive for storing data on a magnetic tape data storage media in a plurality of wraps, which comprise a plurality of parallel longitudinally recorded tracks, said magnetic tape drive having at least one input and/or output, having at least one data buffer, and having a plurality of stepped operational speeds for moving magnetic tape data storage media longitudinally with respect to at least one tape head for transferring data by reading and/or writing data with respect to said magnetic tape data storage media, said magnetic tape drive capable of conducting a backhitch of said magnetic tape data storage media, said computer program product comprising:
  computer readable program code causing said at least one programmable computer processor to estimate the effective data fill and/or empty rate for said at least one data buffer with respect to said at least one input and/or output;
  computer readable program code causing said at least one programmable computer processor to estimate the drive data rate for transferring data with respect to said at least one data buffer and said magnetic tape data storage media at the current stepped operational speed of said magnetic tape drive;
  computer readable program code causing said at least one programmable computer processor to estimate, from said effective data fill and/or empty rate for said at least one data buffer and said drive data rate, the time cost to continue to operate said magnetic tape drive at said current stepped operational speed from a target to substantially the next end of wrap;
  computer readable program code causing said at least one programmable computer processor to estimate, from said effective data fill and/or empty rate for said at least one data buffer and a data rate for transferring data with respect to said magnetic tape data storage media of at least one higher stepped operational speed of said magnetic tape drive, together with a forced backhitch of said magnetic tape drive, the time cost to force a backhitch of said magnetic tape data storage media and change said stepped operational speed to said higher stepped operational speed and to operate said magnetic tape drive at said higher stepped operational speed from said target to substantially the next end of wrap; and
  computer readable program code causing said at least one programmable computer processor to determine the lesser of said time costs.

26. The computer program product of claim 25, additionally comprising:
  computer readable program code causing said at least one programmable computer processor to monitor a threshold between said time cost of said current stepped operational speed; and a lesser time cost to force said backhitch of said magnetic tape data storage media and change said stepped operational speed to said higher stepped operational speed; and
  computer readable program code causing said at least one programmable commuter processor to, if said threshold is met and/or exceeded, select said determined lesser time cost which comprises forcing said backhitch of said magnetic tape data storage media and changing said stepped operational speed to said higher stepped operational speed; and
  computer readable program code causing said at least one programmable computer processor to, if said threshold is unmet and/or unexceeded, select said current stepped operational speed without regard to which estimated time cost comprises said lesser of said estimated time costs.

27. The computer program product of claim 26, wherein said threshold comprises a predetermined count; and wherein said computer program product additionally comprises computer readable program code causing said at least one programmable computer processor to conduct said time cost estimates on a periodic basis and increment said count at each successive instance that said periodic time cost estimates determines said lesser one of said time costs is said time cost to force said backhitch of said magnetic tape data storage media and change said stepped operational speed; and reset said count upon forcing said backhitch.

28. The computer program product of claim 26, additionally comprising computer readable program code causing said at least one programmable computer processor to, if said determined lesser time cost comprises said at least one higher stepped operational speed, and said higher stepped operational speed is selected, control a threshold of said buffer to establish the timing of said backhitch.

29. The computer program product of claim 25, additionally comprising computer readable program code causing said at least one programmable computer processor to determine the distance to an end of wrap, and, if said distance to an end of wrap is less than a predetermined distance, prevent a backhitch.

30. The computer program product of claim 25, additionally comprising computer readable program code causing said at least one programmable computer processor to determine two said stepped operational speeds bounding said estimated effective data fill and/or empty rate for said at least one data buffer; and wherein said computer readable program code which causes said at least one programmable computer processor to determine said lesser time cost, causes said at least one programmable computer processor to determine said lesser time cost with respect to said two operational speeds and said current operational speed.

* * * * *